(12) United States Patent
McClean et al.

(10) Patent No.: US 9,385,504 B2
(45) Date of Patent: Jul. 5, 2016

(54) METHOD AND APPARATUS FOR DEPOLARIZING LIGHT

(71) Applicant: II-VI Incorporated, Saxonburg, PA (US)

(72) Inventors: Ian Peter McClean, Brixham (GB); Nadhum Kadhum Zayer, Newton Abbot (GB)

(73) Assignee: II-VI INCORPORATED, Saxonburg, PA (US)

( * ) Notice: Subject to any disclaimer, the term of this patent is extended or adjusted under 35 U.S.C. 154(b) by 0 days.

(21) Appl. No.: 14/262,550

(22) Filed: Apr. 25, 2014

(65) Prior Publication Data

US 2015/0311668 A1    Oct. 29, 2015

(51) Int. Cl.
*H01S 3/30* (2006.01)
*G02F 1/01* (2006.01)
*H01S 3/094* (2006.01)

(52) U.S. Cl.
CPC ..... *H01S 3/094073* (2013.01); *H01S 3/094096* (2013.01); *H01S 3/302* (2013.01)

(58) Field of Classification Search
CPC ................................. H01S 3/30; G02F 1/0115
See application file for complete search history.

(56) References Cited

U.S. PATENT DOCUMENTS

| | | | |
|---|---|---|---|
| 4,556,293 A * | 12/1985 | Burns et al. | 385/11 |
| 5,345,331 A * | 9/1994 | Bergano et al. | 359/341.31 |
| 5,457,756 A * | 10/1995 | Hartl et al. | 385/11 |
| 6,535,657 B2 * | 3/2003 | Dyott | 385/11 |
| 6,977,769 B2 | 12/2005 | Matsushita et al. | |
| 7,072,369 B2 | 7/2006 | Matsushita et al. | |
| 2001/0053264 A1 * | 12/2001 | Edagawa et al. | 385/27 |
| 2003/0076579 A1 * | 4/2003 | Foursa et al. | 359/341.3 |

FOREIGN PATENT DOCUMENTS

GB    2500220 A  *  9/2013

OTHER PUBLICATIONS

Zhi-Dong et al. "Optimal Length and Maximum-spin-rate for Polarization Transformation in Increscent-Spinning Birefringent Fiber", Optical Fiber Communication & Optoelectronic Exposition & Conference, 2008.*
Band "Light and Matter: Electromagnetism, Optics, Spectroscopy and Lasers", Wiley, 2006, p. 430-431 sect. 7.5.1 Longitudinal modes.*
Search Report for United Kingdom Patent Application No. GB1204439.2, Jul. 24, 2012, 1 Page.
Matar, M., et al., "PCF Hi-Bi 2-Section Fibre Lyot Depolarisers", IEEE Optical Fibre Technology/Australian Optical Society, Jul. 10-13, 2006, pp. 48-50.

* cited by examiner

*Primary Examiner* — Eric Bolda
(74) *Attorney, Agent, or Firm* — Fenwick & West LLP (57) ABSTRACT

A light source assembly (300) for emitting depolarized light, and comprising: at least one light source (312) configured to emit substantially polarized light; and a light depolarizer (318) arranged to receive light from the light source and comprising a high birefringence optical fiber having a longitudinal core and orthogonal birefringent axes having an angular displacement around the core that varies along the length of the fiber, wherein light emitted from the depolarizer comprises a plurality of polarization states.

17 Claims, 6 Drawing Sheets

METHOD AND APPARATUS FOR DEPOLARIZING LIGHT

CROSS REFERENCE TO RELATED APPLICATION

This application is related to United Kingdom Application No. 1204439.2, filed Mar. 14, 2012, which is incorporated by reference in its entirety.

TECHNICAL FIELD

The invention relates to a method and apparatus for depolarizing light using a spun high birefringence (hi-bi) optical fibre. More specifically, the invention relates to a method and apparatus for depolarizing Raman pump light to be output from a Raman pump source, or depolarizing pump light to be output from an Erbium Doped Fibre Amplifier (EDFA) pump source. Further, the invention relates to a method and apparatus for depolarizing Raman pump light in a Raman pump unit or EDFA pump light in an EDFA pump unit.

BACKGROUND

In this specification the term "light" will be used in the sense that it is used in optical systems to mean not just visible light, but also electromagnetic radiation having a wavelength outside that of the visible range.

There are many applications in the field of optics that may require the production of depolarized light, in particular depolarized laser light. For example, a depolarized light output may be used for optical amplification, such as in a Raman amplifier or an erbium doped fibre amplifier (EDFA).

Distributed Raman amplification (DRA) is used in optical networks and can provide advantages of improved reach, improved optical signal-to-noise ratio (OSNR), increased gain bandwidth and flatter gain when compared to other forms of optical amplification.

DRA is achieved by a Raman pump unit injecting high power Raman pump light into a system fibre carrying a signal to be amplified. Typically, a Raman pump unit includes a high power Raman pump laser as a pump source, which provides pump light. The pump light is typically depolarized before being injected into the system fibre as Raman gain in a Raman amplifier can be reduced if the pump light is polarized, since Raman gain is highly polarization dependent.

A number of methods of depolarizing Raman pump light are known.

U.S. Pat. No. 6,977,769 discloses a pump light source device for optical Raman amplification. Combining pump lights through a birefringent material in a polarization beam combiner is disclosed. The composite lightwave output from the combiner is input to a depolarizer comprising birefringent material having a slow axis and a fast axis. The length of the birefringent material of the depolarizer is determined such that the mutual coherence of the pump lights output from the fast axis and the slow axis decreases.

U.S. Pat. No. 7,072,369 discloses a depolarized laser diode module comprising a depolarizer. A polarization maintaining (PM) fibre is arranged at the output side of a laser diode. The depolarizer utilizes a PM fibre for depolarization. The PM fibre output of the laser diode and the PM fibre of the depolarizer are fusion-spliced in such a manner that principal axes of the fibres form an angle of 45 degrees. This type of depolarizer is often termed a fibre Lyot depolarizer. Typically, fibre Lyot depolarizers require up to around 30 m of polarization maintaining fibre to depolarize Raman pump light.

As data speeds get faster, and particularly in coherent systems using 100 Gb/s and above, it is currently expected that, due to data modulation formats, there will be a reduced OSNR budget, meaning techniques for reducing the noise figure in amplifiers is key. As a result, it is envisaged that Raman amplifiers will become more commonly used in systems using 100 Gb/s and above.

Coherent optical systems provide a benefit due to their tolerance of linear impairments, such as Polarisation Mode Dispersion and Chromatic Dispersion. In addition, coherent optical systems allow the use of a more sensitive receiver, thus allowing transmission on similar optical fibre spans as for lower bit rate systems. This is in part supported by use of phase modulation and polarisation multiplexing to produce a modulation scheme with four symbols per bit, which allows the actual baud rate to be four times lower than the transmission speed. However, this provides a restriction on the Polarisation Dependent Loss (PDL) through the spans since both polarisation states are required for the reconstruction of the data. It has been shown that normal levels of PDL impact the OSNR and thus signal detection levels. It is therefore important that any device in the optical span has minimal polarisation dependence. It is known, and described in this document that Raman amplification has strong polarisation dependence and the need to depolarise Raman pump light is well understood. Erbium Doped Fibre amplifiers also have Polarisation Dependent Gain (PDG). In existing systems PDG does not have a big impact on performance, however with coherent transmission the build up of PDG in a series of several in-line amplifiers may begin to impact performance.

Furthermore, there is a desire in the technical field to reduce the size of Raman pump units and EDFA pump units improving their suitability for inclusion in optical devices offering improved functionality, reduced power consumption and/or reduced size. In addition, there is a desire in the technical field to reduce the cost of Raman pump units and increase functionality in EDFA pumps without adding significant cost or complexity to increase their use in optical devices.

SUMMARY OF THE INVENTION

According to the invention in a first aspect, there is provided a light source assembly for emitting depolarized light, and comprising: at least one light source configured to emit substantially polarized light; and a light depolarizer arranged to receive light from the light source and comprising a high birefringence optical fibre having a longitudinal core and orthogonal birefringent axes having an angular displacement around the core that varies along the length of the fibre, wherein light emitted from the depolarizer comprises a plurality of polarization states.

The invention thereby provides a light source assembly capable of producing substantially depolarized light. Such light sources may be used in many applications and, specifically, in a Raman pump unit. As the light emitted from the light source assembly is already depolarized, there is no requirement to include a separate depolarizer.

Optionally, the light source is configured to emit light having a spectrum comprising a plurality of frequencies of light.

Optionally, the high birefringence optical fibre is a spun optical fibre.

Optionally, the rate of change of angular displacement of the birefringent axes varies along the length of the high birefringence optical fibre.

Optionally, the rate of change of angular displacement of the birefringent axes does not vary along the length of the high birefringence optical fibre.

Optionally, the rate of change of angular displacement of the birefringent axes increases from an input end of the high birefringence optical fibre that receives the light, to an output end of the high birefringence optical fibre.

Optionally, the rate of change of the angular displacement of the birefringent axes comprises one or more step changes.

Optionally, the Raman pump source assembly further comprises a wavelength locking reflector incorporated into the high birefringence optical fibre of the depolarizer.

Optionally, the at least one light source comprises first and second light sources, the light source assembly further comprising a PM wavelength multiplexer configured to receive light from the first and second light sources and emit a combined light representing a combination of the light from the first and second light sources, and wherein the depolarizer is configured to receive the combined light.

According to the invention in a second aspect, there is provided a Raman pump source assembly comprising a light source assembly as described above.

According to the invention in a third aspect, there is provided a Raman pump unit comprising at least one Raman pump source assembly as described above.

Optionally, the at least one Raman pump source assembly comprises a plurality of Raman pump source assemblies.

Optionally, the Raman pump unit further comprises a coupler configured to receive and couple depolarized pump light from the plurality of Raman pump source assemblies.

According to the invention in a fourth aspect, there is provided an EDFA pump source assembly comprising a light source assembly as described above.

According to the invention in a fifth aspect, there is provided an EDFA pump unit comprising at least one EDFA pump source assembly as described above.

Optionally, the at least one EDFA pump source assembly comprises a plurality of EDFA pump source assemblies.

Optionally, the EDFA pump unit further comprises a coupler configured to receive and couple depolarized pump light from the plurality of EDFA pump source assemblies.

According to the invention in a sixth aspect, there is provided, a method for depolarizing light comprising: depolarizing light in a light depolarizer comprising a high birefringence optical fibre having a longitudinal core and orthogonal birefringent axes angularly displaced about the core, the angular displacement varying along the length of the fibre, wherein light emitted from the depolarizer comprises a plurality of polarization states.

Optionally, the method further comprises emitting, by a light source, light having a spectrum comprising a plurality of frequencies of light.

According to the invention in a seventh aspect, there is provided a Raman pump unit comprising: at least one pump source; and at least one light depolarizer arranged to receive pump light from the at least one pump source and comprising a high birefringence optical fibre having a longitudinal core and orthogonal birefringent axes having an angular displacement around the core that varies along the length of the fibre, wherein light emitted from the depolarizer comprises a plurality of polarization states.

The Raman pump unit may be constructed of a Raman pump source in combination with a separate depolarizer. In this way, known Raman pump sources may be used and depolarizers in known Raman pump units may be replaced by a spun fibre depolarizer.

BRIEF DESCRIPTION OF THE FIGURES

Exemplary embodiments of the invention will now be described with reference to the accompanying drawings, in which.

SPECIFIC DESCRIPTION

As used herein, the term high birefringence fibre is a well known term of art encompassing polarization maintaining fibres and single-polarization single-mode fibres.

Distributed Raman amplification works by injecting Raman pump light from a pump source into a system fibre carrying a signal to be amplified. Typically, a Raman pump unit comprises multiple Raman pump sources with carefully chosen emission frequencies providing wideband gain, which is desirable in a dense wavelength division multiplexed system since there are a large number of signal channels present.

Several optical functions may be required to condition the pump light ready for injection into the system fibre. These may include the following.

Locking of the pump output wavelength. This is required to maintain a defined pump wavelength to give a known Raman gain profile so that the signal gain is properly controlled in the optical network. This may be done utilizing a fibre grating.

Coupling of several pumps of different wavelengths. Two or more pump sources are generally used to provide two or more wavelengths of pump light to cover C-band wavelength signals. Conventionally, coupling is achieved with thin film filters which are commonly available commercial parts. Alternatively, this can be achieved within a pump package comprising optics to combine pump wavelengths, and using distributed feedback lasers.

Depolarization of the pump light. As stated previously, Raman gain is polarization dependent so it is advantageous to remove as much polarization in the pump light as possible. A typical degree of polarization used, for example, in a backward (or counter propagating) pumping system is approximately 15%.

Isolation of the pump to protect from back reflections.

Disclosed herein is a method and apparatus for depolarizing light, wherein depolarization utilizes an optical fibre having orthogonal birefringent axes that are angularly displaced along the length of the fibre. The method and apparatus has applications for depolarizing pump light in a Raman pump unit. The method and apparatus also have applications in other fields, such as EDFA.

Figure 1:
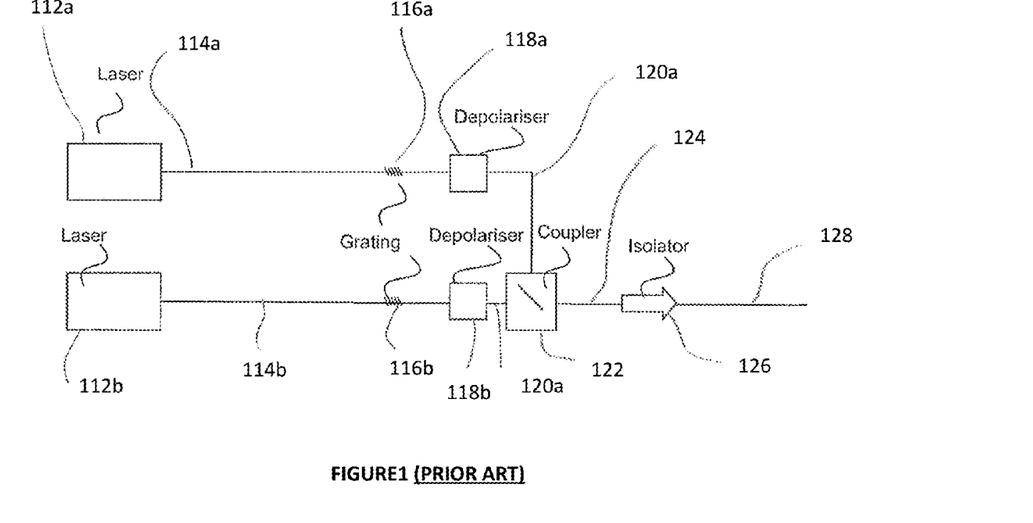
FIG. 1 is a block schematic diagram of a known Raman pump unit.

A schematic representation of a known Raman pump unit 100 is shown in FIG. 1. A Raman pump unit provides Raman pump light suitable for injection into a system fibre carrying a signal to be amplified.

The Raman pump unit 100 comprises two pump sources 112a, 112b. The pump sources 112a, 112b comprise high power laser diodes as light sources configured to generate Raman pump light for injecting into a system fibre. The pump sources 112a, 112b are configured to provide pump light having a wavelength in the 14XX region. The skilled person will appreciate that other pump sources may also be used.

The pump light output from the pump sources 112a, 112b is fed into corresponding lengths of hi-bi fibre 114a, 114b. The hi-bi fibres 114a, 114b provide a transmission medium through which the pump light may travel from the pump sources 112a, 112b via gratings 116a, 116b to depolarizers 118a, 118b. The gratings 116a, 116b provide feedback for locking of the pump source output wavelength as specified above. The gratings 116a, 116b are integrated into the hi-bi fibres 114a, 114b. The depolarizers 118a, 118b depolarize the pump light output from the pump sources 112a, 112b. The depolarized light output from the depolarizers 118a, 118b is transmitted via standard single mode (SM) fibre 120a, 120b to a coupler 122, in which the two depolarized pump lights are combined. Combined depolarized pump light is output from the coupler 122 and transmitted via fibre SM fibre 124 to an isolator 126. The combined depolarized pump light is then output from the Raman pump unit 100 via SM fibre 128. The combined depolarized pump light may then be injected into a system fibre for Raman amplification.

Figure 2:
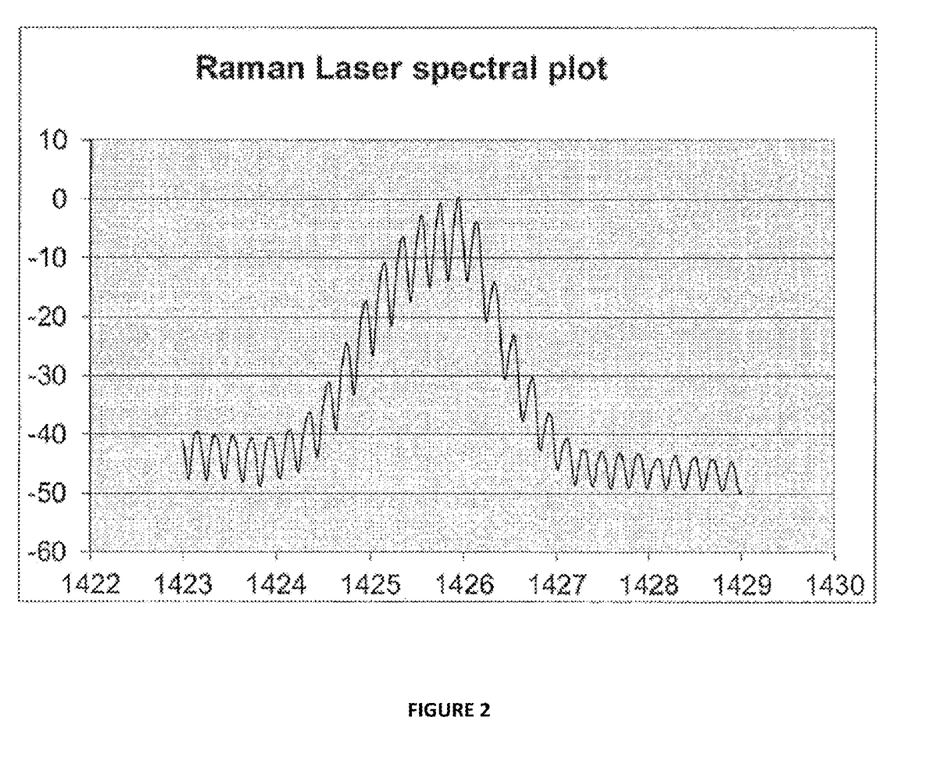
FIG. 2 is a graphical representation of a Raman laser spectral plot.

The pump light produced by a light source, such as those used as pump sources in FIG. 1, typically has a broad spectrum incorporating several longitudinal modes to ensure a high threshold for Stimulated Brillouin scattering. FIG. 2 shows a spectral plot of a typical laser light source output with amplitude expressed on the y-axis in dBs and wavelength expressed on the x-axis in nm. As shown in FIG. 2, the laser light comprises a broad spectrum of frequencies of light ranging from approximately 1424 nm to approximately 1428 nm. In alternative light source assemblies, other spectrums of light may be emitted.

The inventors have appreciated that the laser light is made up of a plurality of frequencies and that this may be exploited when depolarizing the light in, for example, a Raman pump unit.

Figure 3:
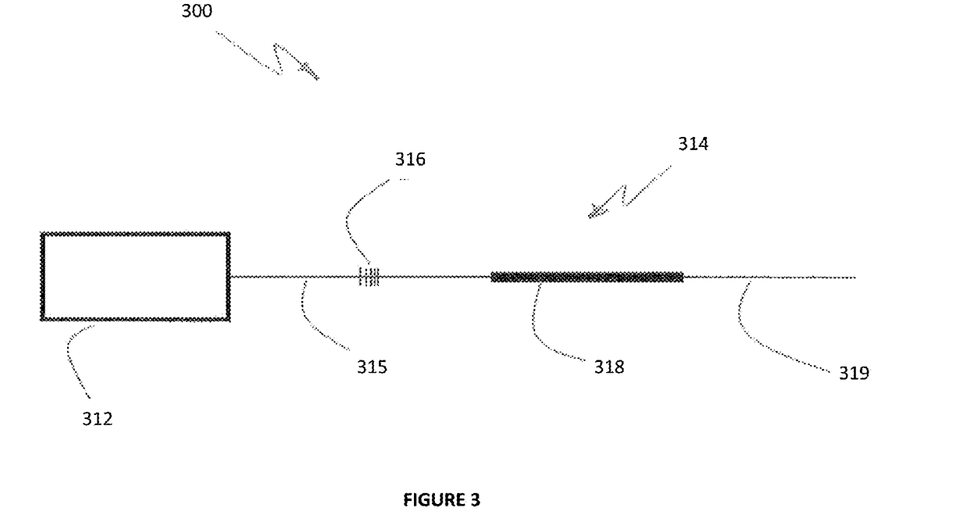
FIG. 3 is a block schematic diagram of a light source assembly.

FIG. 3 shows a light source assembly 300 comprising a light source 312 and a light source output fibre 314. The output fibre 314 is arranged to receive light emitted from the light source 312, and comprises a hi-bi fibre 315, a depolarizer 318 and an output SM fibre 319. A grating 316, such as a fibre Bragg reflector, is included in the hi-bi fibre 315. The light source 312 is a laser.

The depolarizer 318 comprises a hi-bi fibre. More specifically, the depolarizer 318 is integrated into the hi-bioptical fibre tail at the output of the laser 312. The fibre depolarizer 318 has a longitudinal core and orthogonal birefringent axes that are angularly displaced about the core, the angular displacement varying along the length of the fibre. The angular displacement of the orthogonal birefringent axes of the fibre depolarizer 318 is introduced during manufacture, wherein the fibre is spun as it is drawn, or the fibre is twisted post-draw while the fibre is cooling but still at a temperature such that the fibre is pliable.

The laser 312 may be of any suitable type for the intended application. Hi-bioptical fibre 315 is configured to receive light from the laser 312. The hi-bifibre 315 comprises a grating 316. Depolarizer 318 is optically connected to the hi-bi fibre 315. The depolarizer 318 is a spun fibre forming part of the output tail of the laser 312 and therefore there is no need for a separate depolarizer, such as that included in FIG. 1. In alternative light source assemblies the fibre depolarizer 318 may comprise a twisted fibre. However, throughout this document the term "spun hi-bifibre" is used for convenience.

Depolarized light is output from the spun hi-bifibre 318 and is transmitted through SM fibre 319 to provide a depolarized light output from the light source assembly 300. The SM fibre 319 does not have a significant depolarizing effect on the light.

The inventors have appreciated that a spun hi-bi fibre may be used to depolarize light. Specifically, the depolarizing effect of the spun hi-bi fibre of the depolarizer 318 is provided by the varying angular displacement of orthogonal birefringent axes along the length of the spun hi-bifibre of the depolarizer 318. The rate of change of angular displacement of the birefringent axes varies along the length of the spun hi-bi fibre of the depolarizer 318. That is, the orthogonal birefringent axes rotate about the core along the length of the fibre and the rate of rotation varies along the length of the fibre.

The broad spectrum of light from a laser 312 takes advantage of the wavelength dependent variation in birefringence along the spun fibre depolarizer 318 such that, at the output of the spun fibre depolarizer 318, the state of polarization of the broad spectrum is different across the spectrum. This has the effect that the light output from the spun fibre depolarizer 318 is substantially depolarized. The inventors have appreciated that a correctly designed fibre spin and length will ensure light with substantially all states of polarization across the pump spectrum is output from the spun fibre depolarizer 318.

Figure 4:
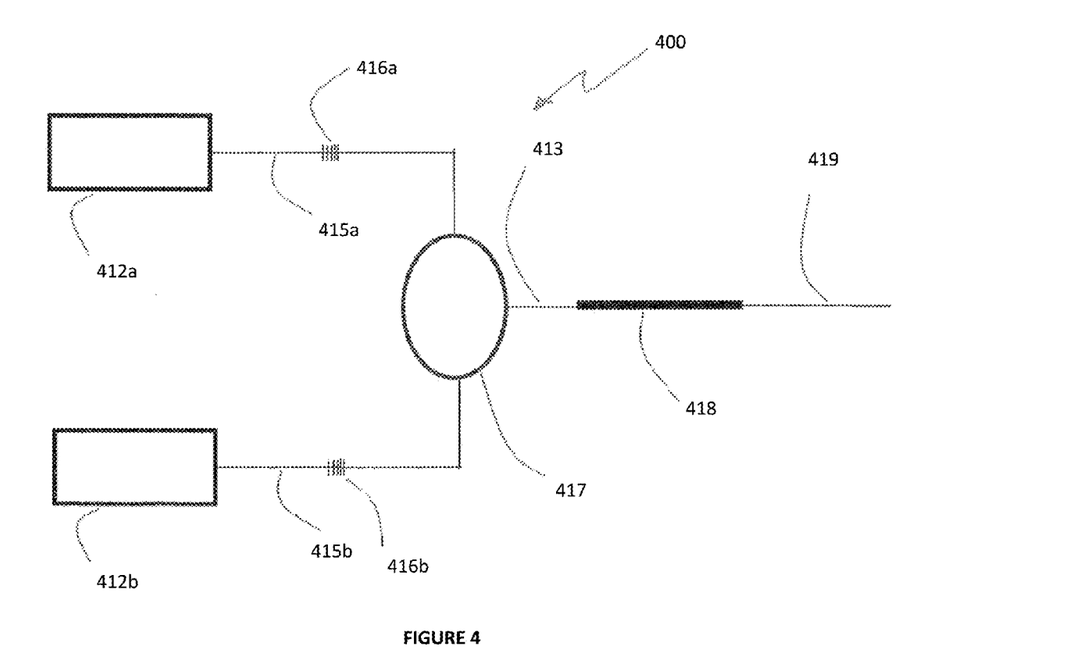
FIG. 4 is a block schematic diagram of a light source assembly.

FIG. 4 shows an alternative exemplary light source assembly 400 comprising two light sources (or lasers) 412a, 412b. Each laser 412a, 412b is connected to a hi-bi fibre 415a, 415b comprising a grating 416a, 416b and in turn connected to a polarization maintaining wavelength multiplexer 417. The polarization maintaining wavelength multiplexer 417 provides a single output into a hi-bi fibre 413. The single hi-bi fibre 413 includes a depolarizer 418. The output of the depolarizer 418 is transmitted into an SM fibre 419 and output from the light source assembly 400.

The principles of operation of the light source assembly 400 of FIG. 4 are similar to those in the light source assembly 300 of FIG. 3. However, the light emitted from each laser 412a, 412b is combined by the polarization maintaining wavelength multiplexer 417 into the single hi-bi fibre 413 before depolarization. In this way, only a single depolarizer 418 is required to depolarize light from a plurality of lasers 412a, 412b.

Further exemplary light source assemblies may comprise a greater number of lasers and/or polarization maintaining wavelength multiplexers.

The exemplary light source assemblies of FIGS. 3 and 4 are configured to operate as Raman light source assemblies. However, the light source assemblies may be configured to operate as EDFA light source assemblies as discussed below.

Figure 5A:
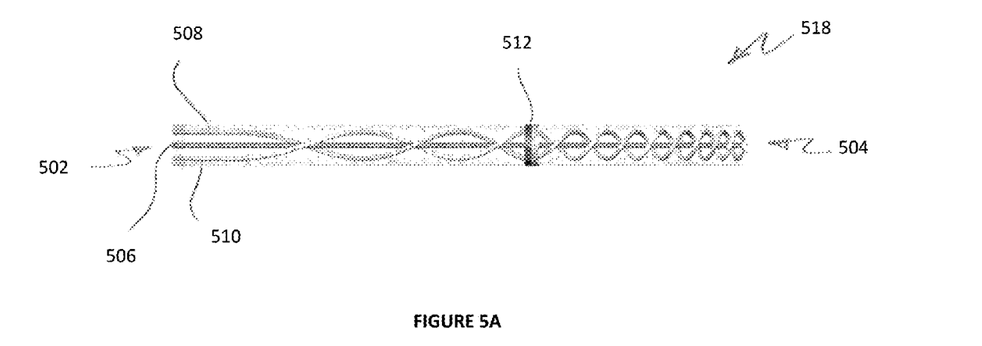
FIG. 5A is a section through a spun hi-bi optical fibre showing the angular displacement of orthogonal birefringent axes.
Figure 5B:
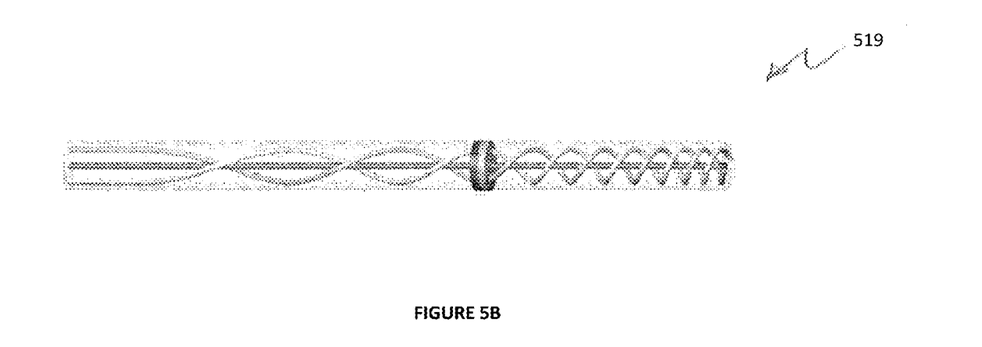
FIG. 5B is a section through a spun hi-bi optical fibre showing the angular displacement of orthogonal birefringent axes.

FIGS. 5A and 5B show sections through exemplary spun hi-bifibres 518, 519 showing the angular displacement of the orthogonal birefringent axes. Hi-bi optical fibres may include stress rods to create the birefringence (often known as Panda fibre) or may have stresses induced using other techniques (one commonly know is called Bow-Tie fibre) and are manufactured by heating a material preform from which the fibre is to be manufactured and drawing the material into a fibre. The stress rods may define the orthogonal birefringent axes along the length of the spun hi-bifibres 418, 419. A spun hi-bifibre may also include stress rods and may be manufactured by spinning the fibre as it is drawn. The effect of spinning a fibre during the drawing process is that the orthogonal birefringent axes of the fibre are varyingly angularly displaced along the length of the fibre. The rate of change of angular displacement of the birefringent axes is proportional to the rate of spin of the fibre during the drawing process.

The spun hi-bi fibres of FIGS. 5A and 5B have unspun (or slow-spun or input) ends 502, which have been formed while no spin was imparted to the fibres during the drawing process, and fast-spun (or output) ends 504, which have been formed while a fast spin has been imparted to the fibres during the drawing process. In other spun hi-bi fibres, the unspun (or slow-spun) end may be the output end and the fast-spun end may be the input end.

Referring to FIG. 5A, the exemplary hi-bi fibre 518 comprises a core 506, a first stress rod 508 and a second stress rod 510. The first and second stress rods 508, 510 rotate about the longitudinal core 506 along the length of the fibre 518. In this example of a spun fibre, the first and second stress rods 508, 510 form the shape of a helix about the longitudinal core. Spun hi-bi fibres may be used as depolarizers in a light source assembly. The spun pattern of a spun hi-bi fibre depolarizer used for light source assemblies may take the form of the spun hi-bi fibres 518, 519. In other light source assemblies, the spun pattern of the stress rods may be different and, in specific Raman amplification applications, may be optimised for the specific Raman pump wavelengths.

The spin rate of the fibre 518 during the drawing process has been kept constant and slow during an initial drawing phase. This has resulted in a constant and slow rate of angular displacement of the stress rods 508, 510 about the core 506 up to a point 512. At point 512, a step change increase in the rate of spin of the fibre 518 is introduced as the fibre 518 is drawn. This can be seen as a step change increase in the rate of angular displacement of the stress rods 508, 510 about the core 506 after point 512. Thereafter, the rate of spin of the fibre 518 during the drawing process is gradually increased. This can be seen as a gradual increase in the rate of angular displacement of the stress rods 508, 510 about the core 506 from the point 512 to the end 504 of the fibre 518.

Referring to FIG. 5B, a further example of a spun hi-bi fibre 519 is shown. In the example of FIG. 5B, the spin rate after the point 512 is greater than in the example of FIG. 5A.

Spun hi-bi optical fibres may be manufactured from silica. Further, spun hi-bi fibres may be, for example, a core fibre, holey fibre or photonic crystal fibre.

In other spun hi-bi fibres, the rate of change of angular displacement may comprise one or more step changes. That is, the rate of spin of the spun hi-bi fibre may be rapidly increased during manufacture of the fibre such that the change in the rate of spin is an apparent step change. This may provide one of more discrete sections of the spun hi-bi fibre having different and discrete rates of angular displacement of the orthogonal birefringent axes.

The effect of the angular displacement of the stress rods 508, 510 of the spun hi-bi fibres 518, 519 shown in FIGS. 5A and 5B is that linearly polarized light transmitted along the fibres 518, 519 from the unspun end 502 toward the fast-spun end 504 can be transformed into a different polarization state, such as circularly polarized light, as it travels along the length of the fibres 518, 519. Conversely, circularly polarized light that is transmitted along the fibres 518, 519 from the fast-spun end 504 toward the unspun end 502 can be transformed into a different polarization state, such as linearly polarized light. The result is that the polarization of light entering one end of the spun hi-bi fibres 518, 519 evolves due to the amount and rate of spinning of the fibres 518, 519. As mentioned above, the amount of polarization evolution varies dependent on the wavelength of the injected light. Therefore, the different wavelengths of light in laser output light, a result of the multi-longitudinal output, experience varying amounts of polarization evolution and with a correctly designed spin can result in a substantially depolarized pump light output from the depolarizers 518, 519.

Figure 6:
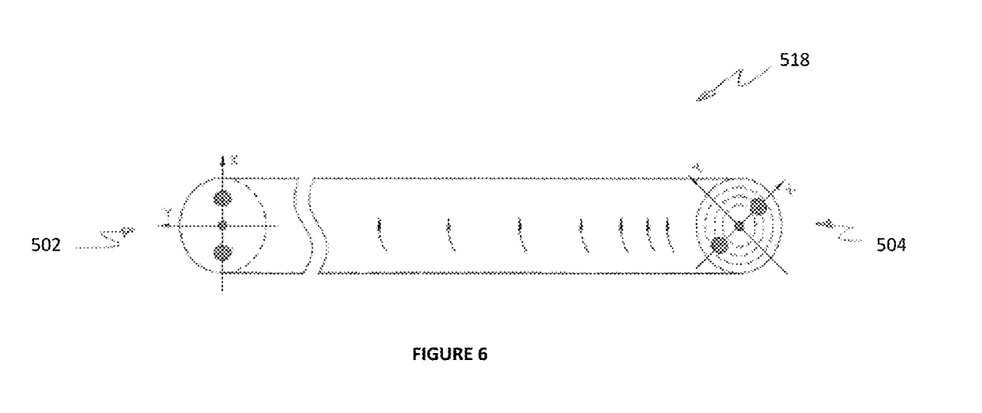
FIG. 6 is a section through a spun hi-bi optical fibre showing the change in polarization of polarized light as it passes through the spun hi-bi optical fibre.

FIG. 6 shows the evolution of polarization state of linear light as it enters the unspun end 502 and travels toward a fast-spun end 504 of the fibre 518.

In exemplary light source assemblies, the unspun ends 502 of the spun hi-bi optical fibre depolarizers 518a, 518b shown in FIG. 5 are configured to receive pump light from the pump source.

The same effect of having orthogonal birefringent axes that are angularly displaced about the longitudinal core along the length of the fibre may be obtained by post draw twisting of the fibre during manufacture. Twisted hi-bifibres may therefore also be utilized as a depolarizer in the light source assemblies disclosed herein.

Referring back to FIG. 3, the laser 312 produces plane polarized light from a front facet. The plane polarized light is coupled into the output fibre 314 and passed via hi-bi fibre 315 and grating 316 to the depolarizer 318. Therefore, by using correctly spun hi-bifibre in the depolarizer 318, the polarization of the light emitted from the laser 312 may be controlled.

The rate of spin of the spun hi-bi fibre used in the depolarizer 318 is determined in dependence on the spectrum of light emitted by the laser 312. The rate of spin is determined in order to produce substantially depolarized light at the output of the depolarizer 318 based on the varying birefringence of the spun hi-bi fibres with frequency of light.

In addition, the spectrum of pump light emitted from a laser is made up of a number of longitudinal modes to prevent stimulated Brillouin scattering problems in the system fibre.

Therefore, the spun hi-bifibre depolarizer 318 may be manufactured to have a strong wavelength dependence of polarization. This results in each mode that exits the laser chip experiencing a different polarization change along the length of the spun hi-bi fibre depolarizer 318 and the output from the fibre depolarizer 318 will therefore be depolarized since the output will be made up of a large number of different polarization states.

Thus, inherent depolarization will occur at the output of the spun hi-bifibre depolarizer 318. As the depolarizer 318 comprises spun hi-bioptical fibres fibre, there is no requirement for a separate depolarizer, such as that used in prior art systems. The incorporation of a depolarizer into hi-bi optical fibres reduces the size and cost of the light source assembly 300.

Light from the laser 312 is coupled to a slow birefringent axis of the spun hi-bifibre depolarizer 318. This is done with active alignment of the spun hi-bifibre depolarizer's 318 stress rods relative to the output of the laser 312 and, more specifically, the output of the hi-bi fibre 315. The spun hi-bifibre depolarizer 318 may be coupled to the output of the laser 312 by incorporating a cylindrical lens at the ends of the spun hi-bifibre depolarizer 318 to be coupled to the output of the laser 312 via the hi-bi fibre 315. The cylindrical lens is aligned to the spun hi-bifibre depolarizer's 318 stress rods and hence achieves a high polarization extinction ratio. In other exemplary light source assemblies, the depolarizer 318 may be fusion spliced to the hi-bi fibre 315 using an alignment technique, which may be an active alignment technique, utilising a polarization splicer. The depolarizer 318 may be fusion spliced to the SM fibre 319, which would not need a PM splicer, but may use a standard splicer. In further exemplary light source assemblies comprising an integrated grating in the hi-bi fibre 315 so that a single piece of birefringent fibre from the output of the laser 312 is used, the depolarizer 318 would be aligned within the package. The output of the depolarizer 318 may still be fusion spliced to the SM fibre 319.

In exemplary spun hi-bi fibres, the length of fibre required to depolarize the light may be in the range from 1 cm to 100 cm. In alternative spun hi-bi fibres, the length of fibre may be in the range from 25 cm to 75 cm.

In other light source assemblies, the grating 316 may be incorporated into the spun hi-bi fibre depolarizer 318. This further reduces the size of the light source assembly 300 as the further hi-bi fibre 315 is not required and the spun hi-bi fibre depolarizer 318 may be configured to receive light directly from the laser 312.

Figure 7:
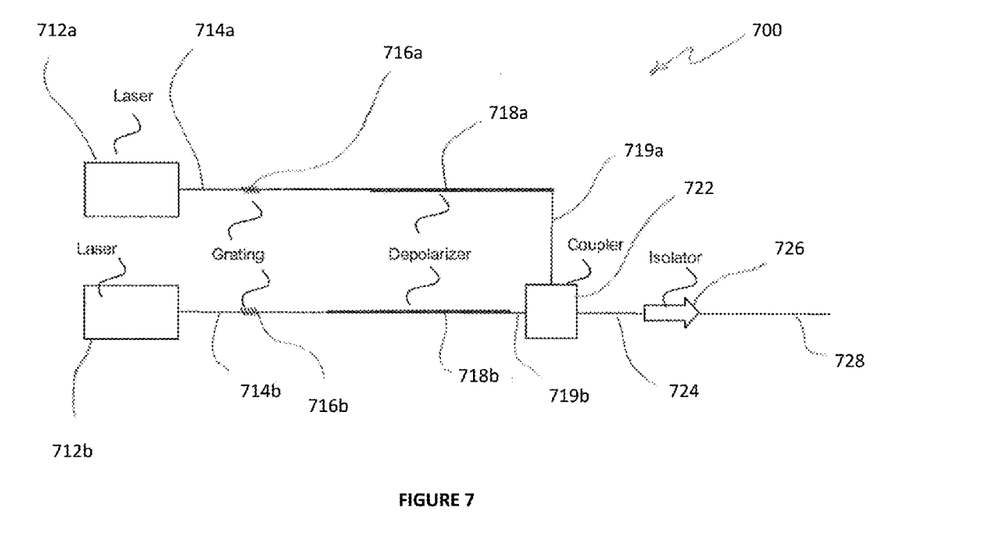
FIG. 7 is a block schematic diagram of a Raman pump unit.

FIG. 7 shows a Raman pump unit 700 wherein depolarizers 718a, 718b comprise a high birefringence (hi-bi) spun fibre. The Raman pump unit may comprise two light source assemblies 300 as described above. The light source assemblies 300 may be used as Raman pump sources with integrated depolarizers to form a Raman pump source assembly. Alternative Raman pump units may comprise a light source assembly 400 as described above, in which only a single depolarizer may be required for a plurality of lasers. In yet further Raman pump units, the Raman pump source and the depolarizer may comprise separate units that are not integrated.

The Raman pump unit 700 comprises depolarizers 718a, 718b integrated into the hi-bioptical fibre tails at the output of the pump sources 712a, 712b. The fibre depolarizers 718a, 718b have a longitudinal core and orthogonal birefringent axes that are angularly displaced about the core, the angular displacement varying along the length of the fibre. The angular displacement of the orthogonal birefringent axes of the fibre depolarizers 718a, 718b is introduced during manufacture, wherein the fibre is spun as it is drawn, or the fibre is twisted post-draw while the fibre is cooling but still at a temperature such that the fibre is pliable.

The Raman pump unit 700 comprises two pump sources 712a, 712b, which may be of any suitable type as discussed above. Hi-bioptical fibres 714a, 714b are configured to receive pump light from the pump sources 712a, 712b. The hi-bifibres 714a, 714b comprise gratings 716a, 716b. The gratings 716a, 716b are configured to set a defined envelope of optical modes and the centre wavelength output from the pump sources 712a, 712b respectively. The gratings 716a, 716b are important features when the light assemblies are utilised in EDFA and Raman amplifiers. Depolarizers 718a, 718b are optically connected to the hi-bi fibres 714a, 714b and are spun hi-bi fibres and may therefore act as depolarizers that depolarize the pump light without the need for a separate depolarizer, such as that included in FIG. 1. In alternative Raman pump units the fibre depolarizers 718a, 718b may be twisted fibres.

Depolarized light is output from the spun hi-bifibres 718a, 718b and is transmitted through SM fibres 719a and 719b to a coupler 722. The SM fibres do not have a significant depolarizing effect on the pump light. Combined depolarized pump light output from the coupler 722 is transmitted via SM fibre 724 to an isolator 726 and then output from the Raman pump unit 700 SM fibre 728.

The inventors have appreciated that a spun hi-bi fibre may be used to depolarize Raman pump light. Specifically, the depolarizing effect of the spun hi-bi fibres of the depolarizers 718a, 718b is provided by the varying angular displacement of orthogonal birefringent axes along the length of the spun hi-bifibres of the depolarizers 718a, 718b. The rate of change of angular displacement of the birefringent axes varies along the length of the spun hi-bi fibres of the depolarizers 718a, 718b. That is, the orthogonal birefringent axes rotate about the core along the length of the fibre and the rate of rotation varies along the length of the fibre. The broad spectrum of pump light from a 14XXnm Raman laser takes advantage of the wavelength dependent variation in birefringence along the spun fibre depolarizers 718a, 718b such that, at the output of the spun fibre depolarizers 718a, 718b, the state of polarization of the broad spectrum is different across the spectrum. This has the effect that the light output from the spun fibre depolarizers 718a, 718b is substantially depolarized. The inventors have appreciated that a correctly designed fibre spin and length will ensure light with substantially all states of polarization across the pump spectrum is output from the spun fibre depolarizers 718a, 718b.

Figure 8:
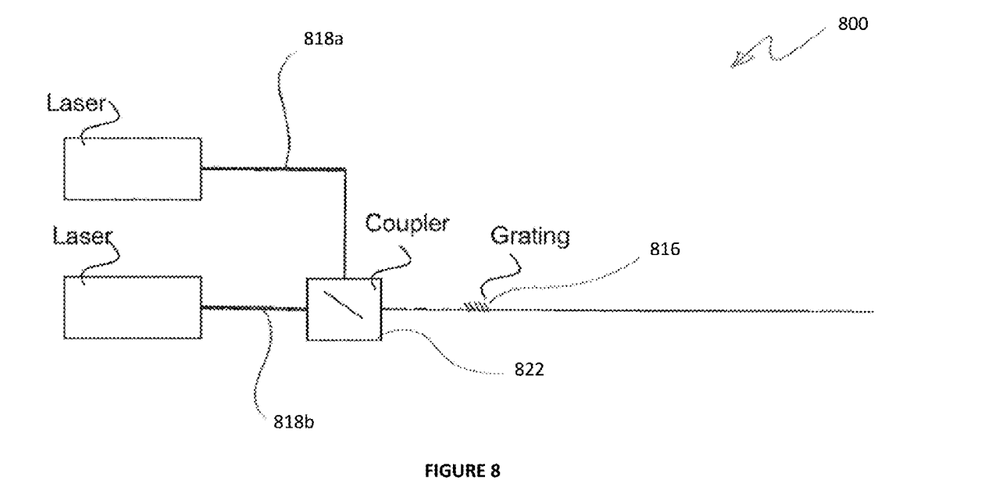
FIG. 8 is a block schematic diagram of a Raman pump unit.

FIG. 8 shows an alternative Raman pump unit 800, in which the length of the spun hi-bi fibres used for the depolarizers 818a, 818b have been reduced by moving the grating 816 further down stream, after the coupler 822.

Figure 9:
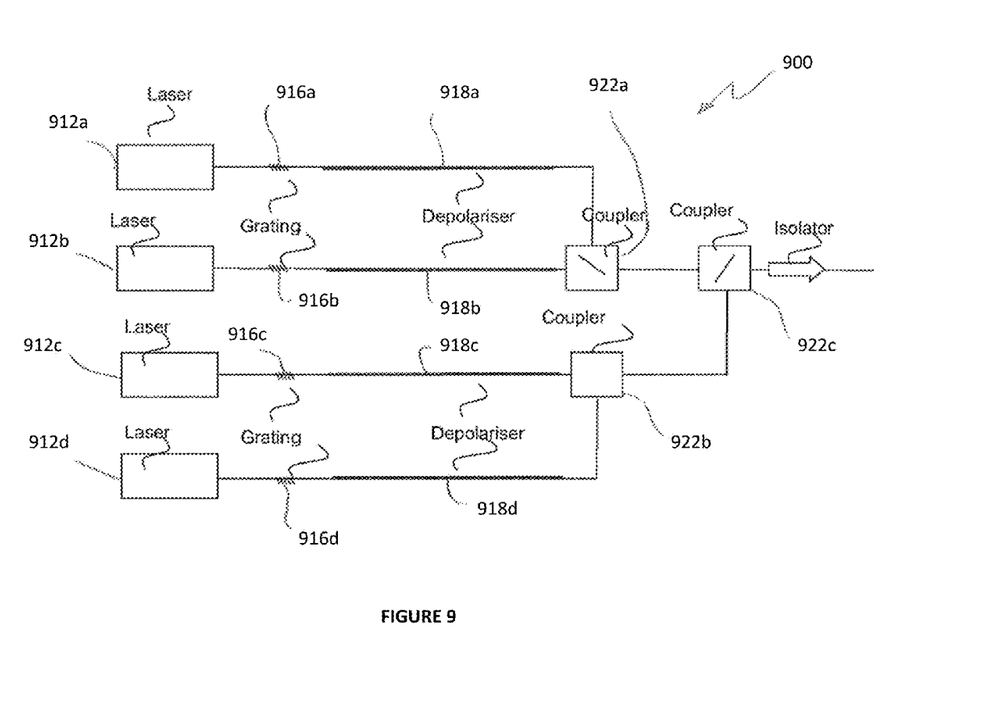
FIG. 9 is a block schematic diagram of a Raman pump unit.

FIG. 9 shows a further alternative Raman pump unit 900 comprising four pump sources 912a, 912b, 912c, 912d, each having a corresponding spun hi-bi fibre depolarizer 918a, 918b, 918c, 918d and grating 916a, 916b, 916c, 916d. A first coupler 922a combines the pump light from pump sources 912a, 912b. A second coupler 922b combines pump light from pump sources 912c, 912d. The combined outputs of the first and second couplers 922a, 922b are then combined in a third coupler 922c to provide a single combined output.

Figure 10:
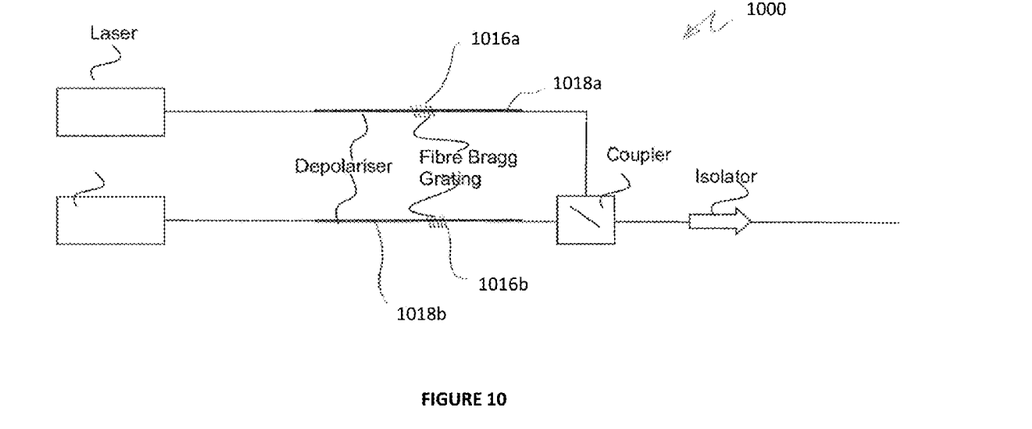
FIG. 10 is a block schematic diagram of a Raman pump unit.

FIG. 10 shows a further alternative Raman pump unit 1000. In the Raman pump unit 1000 gratings 1016a, 1016b may be included within spun hi-bi fibre depolarizers 1018a, 1018b. The gratings 1016a, 1016b may be Fibre Bragg Gratings. The gratings 1016a, 1016b may also be included in the hi-bi fibre depolarizers of the other exemplary Raman pump units discussed above.

The light source assembly described above may also be utilised in EDFAs to provide low polarisation dependent gain (PDG).

PDG occurs when the pump light and the signal light change polarisation alignment. This creates gain variation dependent upon the state of polarisation (SOP) of the incoming signal to be amplified and the incoming pump light. As described above, this behaviour of PDG is exhibited in Raman amplifiers and EDFAs. The effect of PDG is significantly higher in Raman amplifiers and so depolarisation is essential in Raman but has not typically been necessary in EDFA. One way to prevent PDG in Raman amplifiers and EDFAs is to provide a pump with a high number of polarisation states, so that on average the pump and signal will align. This may be used for Raman amplifiers and EDFAs.

Figure 11:
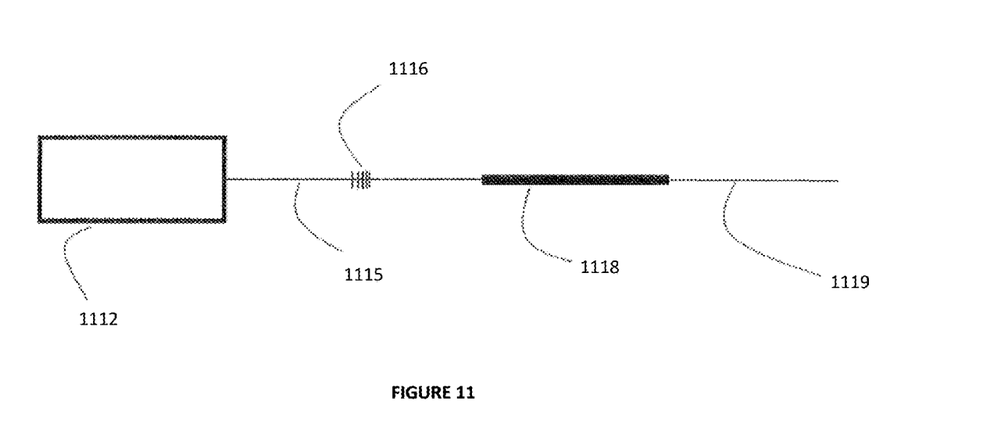
FIG. 11 is a block schematic diagram of an EDFA light source assembly.

The light source assemblies described above may, therefore, be implemented as part of a Raman pump unit or an EDFA pump unit. FIG. 11 shows an EDFA light source assembly 1100 comprising a light source 1112 optically connected to a spun hi-bi fibre depolarizer 1118 via a length of PM fibre 1115 comprising a grating 1116. The configuration and function of the features of the EDFA light source assembly correspond to those of the Raman light source assembly of FIG. 3 except that the light source 1112 is configured to emit light for use in an EDFA and may be manufactured from InGaAs—AlGaAs. Additionally, the rate of rotation of the birefringent axes in the fibre spun depolariser 1118 is configured to provide depolarisation of the light emitted by the light source 1112. The rate of change of angular displacement of the birefringent axes may, therefore, be different to that required for a Raman amplifier application. In other EDFA light source assemblies, a configuration similar to that shown in FIG. 4 may be used.

Figure 12:
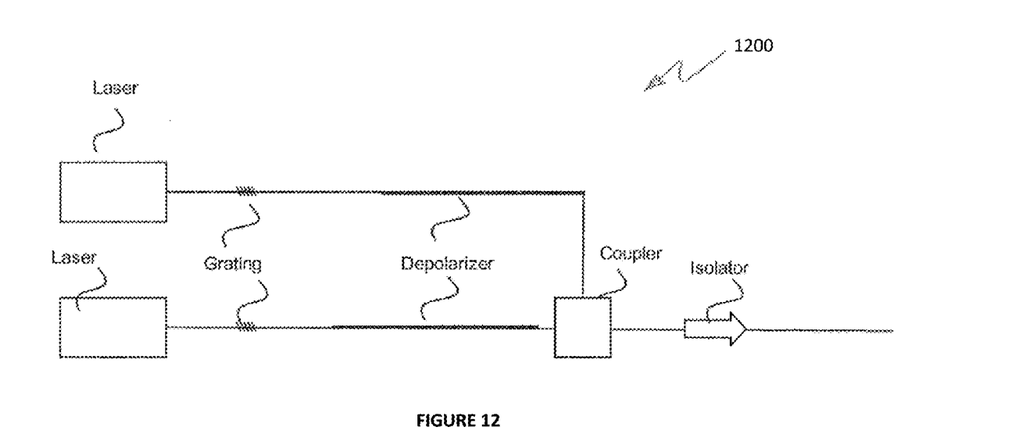
FIG. 12 is a block schematic diagram of an EDFA pump unit.

FIG. 12 shows an EDFA pump unit 1200 comprising the EDFA light source assembly 1100 of FIG. 11. The operation of the EDFA pump unit 1200 corresponds to the operation of the Raman pump unit 700 of FIG. 7. In other EDFA pump units, the configurations of FIGS. 8 to 10 may be employed.

EDFAs may be configured to be used with dual polarisation signals, i.e. optical signals that travel through the transmission format in two separate polarisations. An example of this is Dual Polarisation QPSK, also known as PM-QPSK. If a difference in the loss of power of each of the two signals as they travel from a transmitter to a receiver is high then there will be errors in detection at the receiver. Conventional EDFAs with polarised pump units have gains dependent upon the relative polarisation of the pump light emitted from the pump units and the signal to be amplified. This phenomenon is similar to that seen in Raman amplifiers, although it is less severe, and results in PDG. In PDG a signal having one polarisation is subjected to a different gain to a signal having another polarisation, which adds to the variation in output power, particularly when EDFAs are arranged in a chain of, say, 10 to 20 amplifiers. Using a depolarised EDFA light source assembly 1100 averages the PDG of the signals as they travel through the EDFA and thus removes its influence. The depolarised EDFA light source assembly 1100 may be a single pump with spun fibre as in FIG. 11, but exemplary EDFA light source assemblies may comprise a spun fibre 1118 after the grating 1116, before the grating 1116 or have the grating 1116 within the spun hi-bi fibre depolarizer 1118.

The skilled person will appreciate that many features shown in the various Raman pump units discussed above may also be incorporated into other Raman pump units.

The skilled person will envisage other Raman pump units without departing from the scope of the appended claims.

The invention claimed is:

1. A light source assembly for emitting depolarized light for use in optical amplification, comprising:
   at least one light source configured to emit substantially polarized light in a plurality of longitudinal modes and having a spectrum comprising a plurality of frequencies; and
   a light depolarizer arranged to receive light from the light source and comprising a high birefringence optical fibre having a longitudinal core and orthogonal birefringent axes having an angular displacement around the core that varies along the length of the fibre, the high birefringence optical fibre including a first portion of the orthogonal birefringent axes that is coupled to a second portion of the orthogonal birefringent axes, and there is a step change between a first rate of change of the angular displacement of the first portion of the orthogonal birefringent axes around the core and a second rate of change of the angular displacement of the second portion of the orthogonal birefringent axes around the core, wherein light emitted from the depolarizer comprises a plurality of polarization states.

2. The light source assembly according to claim 1, wherein the high birefringence optical fibre is a spun optical fibre.

3. The light source assembly according to claim 1, wherein the rate of change of angular displacement of the birefringent axes varies along the length of the high birefringence optical fibre.

4. The light source assembly according to claim 1, wherein the rate of change of angular displacement of the birefringent axes does not vary along the length of the high birefringence optical fibre.

5. The light source assembly according to claim 1, wherein the rate of change of angular displacement of the birefringent axes increases from an input end of the high birefringence optical fibre that receives the light, to an output end of the high birefringence optical fibre.

6. The light source assembly according to claim 1 further comprising a wavelength locking reflector incorporated into the high birefringence optical fibre of the depolarizer.

7. The light source assembly according to claim 1,
   wherein the at least one light source comprises first and second light sources,
   the light source assembly further comprising a PM wavelength multiplexer configured to receive light from the first and second light sources and emit a combined light representing a combination of the light from the first and second light sources,
   and wherein the depolarizer is configured to receive the combined light.

8. A Raman pump source assembly comprising a light source assembly according to claim 1.

9. A Raman pump unit comprising at least one Raman pump source assembly according to claim 8.

10. The Raman pump unit according to claim 9, wherein the at least one Raman pump source assembly comprises a plurality of Raman pump source assemblies.

11. The Raman pump unit according to claim 10 further comprising a coupler configured to receive and couple depolarized pump light from the plurality of Raman pump source assemblies.

12. An EDFA pump source assembly comprising a light source assembly according to claim 1.

13. The EDFA pump unit comprising at least one EDFA pump source assembly according to claim 12.

14. The EDFA pump unit according to claim 13, wherein the at least one EDFA pump source assembly comprises a plurality of EDFA pump source assemblies.

15. The EDFA pump unit according to claim 14 further comprising a coupler configured to receive and couple depolarized pump light from the plurality of EDFA pump source assemblies.

16. A method for depolarizing light comprising:
   depolarizing light having a plurality of longitudinal modes and a plurality of frequencies in a light depolarizer comprising a high birefringence optical fibre having a longitudinal core and orthogonal birefringent axes angularly displaced about the core, the angular displacement varying along the length of the fibre, the high birefringence optical fibre including a first portion of the orthogonal birefringent axes that is coupled to a second portion of the orthogonal birefringent axes, and there is a step change between a first rate of change of the angular displacement of the first portion of the orthogonal birefringent axes around the core and a second rate of change of the angular displacement of the second portion of the orthogonal birefringent axes around the core; and transmitting said light into an optical amplification unit, wherein light emitted from the depolarizer comprises a plurality of polarization states.

17. A Raman pump unit comprising:

at least one Raman pump source configured to emit substantially polarized light in a plurality of longitudinal modes and having a spectrum comprising a plurality of frequencies;

at least one light depolarizer arranged to receive pump light from the at least one pump source and comprising a high birefringence optical fibre having a longitudinal core and orthogonal birefringent axes having an angular displacement around the core that varies along the length of the fibre, wherein light emitted from the depolarizer comprises a plurality of polarization states, and the high birefringence optical fibre includes a first portion of the orthogonal birefringent axes that is coupled to a second portion of the orthogonal birefringent axes, and there is a step change between a first rate of change of the angular displacement of the first portion of the orthogonal birefringent axes around the core and a second rate of change of the angular displacement of the second portion of the orthogonal birefringent axes around the core; and a gain section into which light emanating from the depolarizer is transmitted.

* * * * *